(12) United States Patent
Yoshimoto et al.

(10) Patent No.: US 11,203,548 B2
(45) Date of Patent: Dec. 21, 2021

(54) OPTICAL GLASS, OPTICAL ELEMENT COMPOSED OF OPTICAL GLASS, OPTICAL SYSTEM INTERCHANGEABLE LENS, AND OPTICAL DEVICE

(71) Applicant: NIKON CORPORATION, Tokyo (JP)

(72) Inventors: Kohei Yoshimoto, Kawasaki (JP); Motoi Ueda, Naka (JP); Hiroshi Yamamoto, Yamato (JP); Tatsunori Kawashima, Sagamihara (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 16/823,860

(22) Filed: Mar. 19, 2020

(65) Prior Publication Data

US 2020/0223739 A1 Jul. 16, 2020

Related U.S. Application Data

(63) Continuation of application No. PCT/JP2018/014932, filed on Apr. 9, 2018.

(30) Foreign Application Priority Data

Sep. 21, 2017 (JP) ............... JP2017-181028

(51) Int. Cl.
*C03C 3/12* (2006.01)
*C03C 3/15* (2006.01)
*C03C 3/068* (2006.01)

(52) U.S. Cl.
CPC .......... *C03C 3/068* (2013.01); *C03C 2201/10* (2013.01); *C03C 2201/3411* (2013.01);
(Continued)

(58) Field of Classification Search
CPC ............ C03C 3/068; C03C 2201/3417; C03C 2201/3452; C03C 2201/3411
(Continued)

(56) References Cited

U.S. PATENT DOCUMENTS 4,439,531 A 3/1984 Mennemann et al.
4,584,279 A * 4/1986 Grabowski ............. C03C 3/068
501/78
(Continued)

FOREIGN PATENT DOCUMENTS

JP 54-133506 10/1979
JP 58-26049 2/1983
(Continued)

OTHER PUBLICATIONS

International Search report dated Mar. 7, 2018, in corresponding International Patent Application No. PCT/2018/014932.
(Continued)

*Primary Examiner* — Lauren R Colgan

(57) ABSTRACT

An optical glass includes, in terms of mol % of cations, a total amount of $La^{3+}$, $Y^{3+}$, and $Gd^{3+}$ components falling within a range of from 5% to 65% and a total amount of $Zr^{4+}$, $Hf^{4+}$, and $Ta^{5+}$ components failing within a range of from 5% to 65%, and a relationship expressed in Expression (1) given below is satisfied. $(La^{3+}+Y^{3+}+Gd^{3+})\times(Zr^{4+}\ Hf^{4+}+Ta^{3+})\geq 400(\%)^2$.

38 Claims, 4 Drawing Sheets

(52) U.S. Cl.
CPC ................ *C03C 2201/3417* (2013.01); *C03C 2201/3452* (2013.01); *C03C 2201/36* (2013.01)

(58) Field of Classification Search
USPC ............................................ 428/426; 501/78
See application file for complete search history.

(56) References Cited

U.S. PATENT DOCUMENTS

| | | | | |
|---|---|---|---|---|
| 8,127,570 B2* | 3/2012 | Negishi | .................. | C03B 17/06 65/61 |
| 8,207,075 B2* | 6/2012 | Uehara | .................... | G02B 1/02 501/51 |
| 8,263,510 B2* | 9/2012 | Kobayashi | .............. | C03B 17/04 501/51 |
| 9,018,116 B2* | 4/2015 | Schreder | ................. | C03C 3/068 501/78 |
| 2009/0011918 A1* | 1/2009 | Tsutsumi | ................. | G02B 1/00 501/78 |
| 2009/0325779 A1* | 12/2009 | Negishi | .................. | C03C 3/068 501/78 |
| 2010/0240516 A1* | 9/2010 | Tomeno | .................. | C03C 3/068 501/78 |
| 2010/0304950 A1* | 12/2010 | Tomeno | .................. | C03C 3/068 501/78 |
| 2011/0028300 A1* | 2/2011 | Zou | ....................... | C03B 17/062 501/78 |
| 2011/0105294 A1* | 5/2011 | Negishi | .................. | C03C 3/155 501/42 |
| 2011/0136652 A1* | 6/2011 | Ritter | ...................... | C03C 3/155 501/43 |
| 2011/0143911 A1* | 6/2011 | Menke | .................. | C04B 35/632 501/137 |
| 2011/0263410 A1* | 10/2011 | Negishi | .................. | C03C 3/155 501/78 |
| 2012/0270719 A1* | 10/2012 | Negishi | ..................... | C03C 3/14 501/42 |
| 2013/0172169 A1* | 7/2013 | Negishi | .................. | C03C 3/068 501/78 |
| 2014/0256531 A1* | 9/2014 | Endo | ......................... | C03C 3/15 501/42 |
| 2015/0031525 A1* | 1/2015 | Negishi | .................. | C03C 3/155 501/64 |
| 2015/0045204 A1* | 2/2015 | Negishi | .................. | C03B 40/02 501/78 |
| 2015/0119228 A1* | 4/2015 | Negishi | .................. | C03B 11/08 501/78 |
| 2016/0194237 A1* | 7/2016 | Negishi | .................. | C03C 3/068 501/78 |
| 2019/0185369 A1* | 6/2019 | Inoue | ........................ | C03C 3/15 |

FOREIGN PATENT DOCUMENTS

| | | |
|---|---|---|
| JP | 59-13647 | 1/1984 |
| JP | 60-131845 | 7/1985 |
| JP | 2012-17254 | 1/2012 |
| JP | 2016-8150 | 1/2016 |

OTHER PUBLICATIONS

Extended European Search Report, dated May 25, 2021, in corresponding European Patent Application No. 18858457.7 (7 pp.).

* cited by examiner

OPTICAL GLASS, OPTICAL ELEMENT COMPOSED OF OPTICAL GLASS, OPTICAL SYSTEM INTERCHANGEABLE LENS, AND OPTICAL DEVICE

CROSS-REFERENCE TO RELATED APPLICATIONS

This application is a Continuation Application, under 35 U.S.C. § 111(a), of International Patent Application No. PCT/JP2018/014932, filed on Apr. 9, 2018, which claims foreign priority benefit to Japanese Patent Application No. 2017-181028, filed Sep. 21, 2017, the disclosures of which are herein incorporated by reference in their entireties.

TECHNICAL FIELD

The present invention relates to an optical glass, an optical element composed of the optical glass, an optical system, an interchangeable lens, and an optical device. The present invention claims priority to Japanese Patent Application No. 2017-181028, filed on Sep. 21, 2017, the contents of which are incorporated by reference herein in its entirety in designated states where the incorporation of documents by reference is approved.

BACKGROUND ART

An optical glass is used in various optical elements and optical devices. For example, Patent Literature 1 discloses a halide glass used for an ultraviolet region to an infrared region. In order to improve a degree of freedom in design of an optical system used for an optical device, development of an optical glass having a high refractive index has been demanded. However, when a composition is adjusted so as to obtain a high refractive index of the optical glass, vitrification tends to be difficult.

CITATION LIST

Patent Literature

PTL 1: JP H07-081973 A

SUMMARY OF INVENTION

A first aspect according to the present invention is an optical glass including, in terms of mol % of cations, a total amount of $La^{3+}$, $Y^{3+}$, and $Gd^{3+}$ components falling within a range of from 5% to 65% and a total amount of $Zr^{4+}$, $Hf^{4+}$, and $Ta^{5+}$ components falling within a range of from 5% to 65%, and a relationship expressed in Expression (1) given below is satisfied;

$$(La^{3+}Y^{3+}Gd^{3+}) \times (Zr^{4+}Hf^{4+}+Ta^{5+}) \geq 400(\%)^2 \tag{1}$$

A second aspect according to the present invention is an optical element composed of the optical glass according to the first aspect.

A third aspect according to the present invention is an optical system using the optical element according to the second aspect.

A fourth aspect according to the present invention is an interchangeable lens including the optical system according to the third aspect.

A fifth aspect according to the present invention is an optical device including the optical element according to the second aspect.

DESCRIPTION OF EMBODIMENTS

Figure 1:
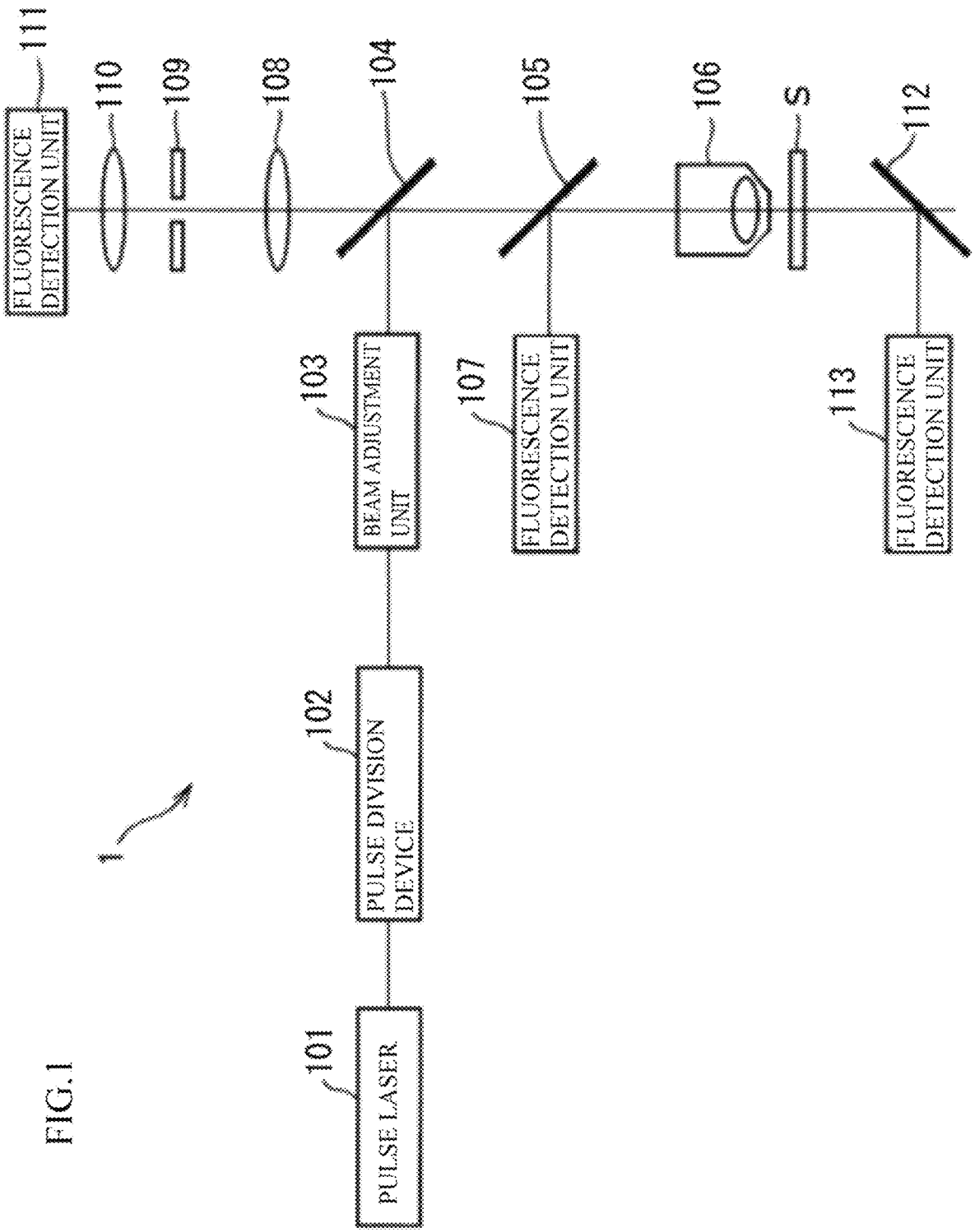
FIG. 1 is a block diagram illustrating an example of a configuration of a multi-photon microscope including an optical element using an optical glass according to the present embodiment.

Hereinafter, description is made on an embodiment of the present invention (hereinafter, referred to as the "present embodiment"). The present embodiment described below is an example for describing the present invention, and is not intended to limit the present invention to the contents described below.

Description is made below on a component composition, physical properties, and the lice of an optical glass according to the present embodiment. Note that, in the present specification, a content amount of each of all the components is expressed by mol % in terms of cations unless otherwise stated.

<Optical Glass>

An optical glass according to the present embodiment is an optical glass including, in Terms of mol % of cations a total amount of $La^{3+}$, $Y^{3+}$, and $Gd^{3+}$ components falling within a range of from 5% to 65% and a total amount of $Zr^{4+}$, $Hf^{4+}$, and $Ta^{5+}$ components falling within a range of from 5% to 65%, and a relationship expressed in Expression (1) given below is satisfied.

$$(La^{3+}Y^{3+}Gd^{3+}) \times (Zr^{4+}+Hf^{4+}+Ta^{5+}) \geq 400(\%)^2 \tag{1}$$

A mode of each cation is not particularly limited, and a cation is contained in the optical glass in a mode of an oxide described later, for example. The optical glass according to the present embodiment is a novel optical glass that enables vitrification even when a content amount of cations forming a network former oxide such as $SiO_2$ and $B_2O_3$ and the like is low. Further, an optical glass having a high refractive index and low wavelength dependency of a refractive index can be obtained. In general, regarding the optical glass, it is difficult to obtain both a high refractive index and low dispersibility (wavelength dependency of a refractive index) in a compatible manner, and there is a problem in that those factors tend to have a trade-off relationship. In view of this, it is also difficult to achieve an optical glass having a high refractive index and low dispersibility. In this respect, the optical glass according to the present embodiment contains the component composition described above, and hence such properties can be provided.

$La^{3+}$, $Y^{3+}$, and $Gd^{3+}$ being rear earth components are components capable of increasing a refractive index without losing low dispersibility, and are respectively contained as $La_2O_3$, $Y_2O_3$, and $Gd_2O_3$ in terms of an oxide-converted composition, for example. When a total amount of $La^{3+}$, $Y^{3+}$, and $Gd^{3+}$ ($La^{3+}+Y^{3+}+Gd^{3+}$) is small, the effect described above is not sufficient. When the total amount exceeds 65%, the glass is more likely to be devitrificated. In view of this, $La^{3+}$ $Y^{3+}$ $Gd^{3+}$ falls within a range of from 5% to 65%, more preferably from 30% to 60%, further more preferably from 40% to 55%.

La$^{3+}$ is a component contained as La$_2$O$_3$ in terms of an oxide-converted composition, for example. La$^{3+}$ has an effect of increasing a refractive index without losing low dispersibility, and is capable of maintaining glass-devitrification resistance. In view of this, the content amount preferably falls within a range of from 0% to 65%, more preferably from 20% to 60%, further more preferably from 30% to 55%.

Y$^{3+}$ is a component contained as Y$_2$O$_3$ in terms of an oxide-converted composition, for example. Y$^{3+}$ is a component capable of increasing a refractive index without losing low dispersibility, and particularly is capable of further improving devitrification resistance by coexisting with La$^{3+}$ in the glass. In view of this, the content amount preferably falls within a range of from 0% to 10%, more preferably from 0% to 7%, further more preferably from 0% to 5%. Further, both La$^{3+}$ and Y$^{3+}$ are preferably contained.

Gd$^{3+}$ is a component contained as Gd$_2$O$_3$ in terms of an oxide-converted composition, for example. Gd$^{3+}$ is a component capable of increasing a refractive index without losing low dispersibility, and particularly is capable of further improving glass-devitrification resistance by coexisting with La$^{3+}$ in the glass. In view of this, the content amount preferably falls within a range of from 0% to 20%, more preferably from 0% to 15%, further more preferably from 0% to 10%. Further, both La$^{3+}$ and Gd$^{3+}$ are preferably contained.

Similarly to the rear earth components described above, Zr$^{4+}$, Hf$^{4+}$, Ta$^{5+}$ being transition metal components are components having an effect of increasing a refractive index of the glass without losing low dispersibility greatly, and has an effect of further increasing a refractive index more than the rear earth components. Zr$^{4+}$, Hf$^{4+}$, and Ta$^{5+}$ are respectively contained as ZrO$_2$, HfO$_2$, and Ta$_2$O$_5$ in terms of an oxide-converted composition, for example. When a total amount of Zr$^{4+}$, Hf$^{4+}$, and Ta$^{5+}$ (Zr$^{4+}$+Hf$^{4+}$+Ta$^{5+}$) is small, the effect described above is not sufficient. When the total amount of those components exceeds 60%, the glass is more likely to be devitrificated. In view of this, (Zr$^{4+}$+Hf$^{4+}$+Ta$^{5+}$) falls within a range of from 5% to 65%, preferably from 20% to 60%, more preferably from 30% to 60%.

Zr$^{4+}$ is a component contained as ZrO$_2$ in terms of an oxide-converted composition, for example. Zr$^{4+}$ exerts an effect of increasing a refractive index of the glass while maintaining low dispersibility. In view of a refractive index and glass-devitrification resistance, the content amount preferably falls within a range of from 0% to 15%, more preferably from 0% to 10%, further more preferably from 0% to 8%.

Hf$^{4+}$ is a component contained as HfO$_2$ in terms of an oxide-converted composition, for example. Hf$^{4+}$ exerts an effect of increasing a refractive index of the glass while maintaining low dispersibility. In view of a refractive index and glass-devitrification resistance, the content amount preferably falls within a range of from 0% to 10%, more preferably from 0% to 7%, further more preferably from 0% to 5%.

Ta$^{5+}$ is a component contained as Ta$_2$O$_5$ in terms of an oxide-converted composition, for example. Ta$^{5+}$ has an effect of increasing a refractive index of the glass while maintaining low dispersibility and an effect of improving glass-devitrification resistance. In view of this, the content amount preferably falls within a range of from 5% to 65%, more preferably from 10% to 50%, further more preferably from 15% to 40%.

The optical glass according to the present embodiment satisfies a relationship expressed in Expression (1) given below. In addition to the rare earth oxides described above, specific transition metal components such as Zr$^{4+}$, Hf$^{4+}$, and Ta$^{5+}$ are combined to satisfy a relationship expressed in Expression (1). With this, a high refractive index and low dispersibility can be achieved in a compatible manner at a high level.

$$(La^{3+}+Y^{3+}+Gd^{3+})\times(Zr^{4+}+Hf^{4+}+Ta^{5+})\geq 400(\%)^2 \quad (1)$$

Further, Expression (1) preferably satisfies Expression (1a) given below, more preferably satisfies Expression (1b) given below. When such condition is satisfied, both a high refractive index and low dispersibility can be achieved in a compatible manner at a higher level as compared to a case where an optical glass contains either one of rear earth components and transition metal components.

$$(La^{3+}+Y^{3+}+Gd^{3+})\times(Zr^{4+}+Hf^{4+}+Ta^{5+})\geq 800(\%)^2 \quad (1a)$$

$$(La^{3+}+Y^{3+}+Gd^{3+})\times(Zr^{4+}+Hf^{4+}+Ta^{5+})\geq 1200(\%)^2 \quad (1b)$$

The upper limit value of Expression (1) is not particularly limited. In view of maintaining glass-devitrification resistance, the upper limit value is preferably 2,400(%)$^2$ or less (see Expression ((1c) given below), more preferably 2,000 (%)$^2$ or less (see Expression (1d) given below).

$$2400(\%)^2\geq(La^{3+}+Y^{3+}+Gd^{3+})\times(Zr^{4+}+Hf^{4+}+Ta^{5+})\geq 400(\%)^2 \quad (1c)$$

$$2000(\%)^2\geq(La^{3+}+Y^{3+}+Gd^{3+})\times(Zr^{4+}+Hf^{4+}+Ta^{5+})\geq 400(\%)^2 \quad (1d)$$

Further, the optical glass according to the present embodiment preferably contains at least one component selected from a group consisting of Ga$^{3+}$, Al$^{3+}$, Si$^{4+}$, B$^{3+}$, Mg$^{2+}$, Ca$^{2+}$, Sr$^{2+}$, Ba$^{2+}$, Ti$^{4+}$, Nb$^{5+}$, and W$^{6+}$. In place of one of those, two or more components may be used. A mode of each cation is not particularly limited, and a cation may be contained in the optical glass in a mode of an oxide described later, for example. When such component is further contained, glass formability at the time of manufacturing the optical glass can be improved.

Ga$^{3+}$ is a component contained as Ga$_2$O$_3$ in terms of an oxide-converted composition, for example. Ga$^{3+}$ can further improve glass stability while maintaining a high refractive index and low dispersibility. In view of such effects and the content amounts of rear earth components and transition metal components, the content amount preferably falls within a range of from 0% to 60%, more preferably exceeds 0% up to 30% (exceeding 0% and equal to or less than 30%), further more preferably exceeds 0% up to 15% (exceeding 0% and equal to or less than 15%).

Al$^{3+}$ is a component contained as Al$_2$O$_3$ in terms of an oxide-converted composition, for example. Al$^{3+}$ can improve glass stability and ultraviolet transmittance. In view of such effects and the refractive index, the content amount preferably falls within a range of from 0% to 20%, more preferably from 0% to 10%, further preferably from 0% to 5%, still further preferably 0%.

Si$^{4+}$ is a component contained as SiO$_2$ in terms of an oxide-converted composition, for example, and is a component forming a network former oxide. Due to Si$^{4+}$, glass formability can be more likely to be improved. In view of such effects and the refractive index, the content amount preferably fails within a range of from 0% to 30%, more preferably from 0% to 20%, further more preferably from 0% to 10%, further more preferably 0%. The optical glass according to the present embodiment enables vitrification even when a content amount of $Si^{4+}$ forming a network former oxide is reduced, and excellent physical properties can be provided.

$B^{3+}$ is a component contained as $B_2O_3$ in terms of an oxide-converted composition, for example, and is a component forming a network former oxide. Due to $B^{1+}$, glass formability can be more likely to be improved. Meanwhile, $B^{3+}$ is a component with high volatility. Thus, when $B^{3+}$ is excessively introduced, a glass composition is changed, which may degrade striae quality in some cases. Further, when $B^{3+}$ is excessively introduced, a refractive index may be reduced in some cases. In view of this, the content amount preferably falls within a range of from 0% to 10%, more preferably from 0% to 5%, further more preferably from 0% to 3%, further more preferably 0%. The optical glass according to the present embodiment enables vitrification even when a content amount of $B^{3+}$ forming a network former oxide is reduced, and excellent physical properties can be provided.

$Ti^{4+}$ and $Nb^{5+}$ are components contained as $TiO_2$ and $Nb_2O_5$, respectively, in terms of an oxide-converted composition, for example. $Ti^{4+}$ and $Nb^{5+}$ can further improve a refractive index of the glass. In view of such effects and dispersibility, the content amounts each preferably fall within a range of from 0% to 20%, more preferably from 0% to 10%, further more preferably from 0% to 5%.

$W^{6+}$ is a component contained as $WO_3$ in terms of an oxide-converted composition, for example. $W^{6+}$ is capable of increasing a refractive index. In view of such effects and dispersibility, the content amount preferably falls within a range of from 0% to 10%, more preferably from 0% to 5%, further more preferably from 0%.

An alkali earth metal oxide $R^{2+}$ (R referrers to one or more selected from Mg, Ca, Sr, and Ba) is a component contained as RO in terms of an oxide-converted composition, for example. $R^{2+}$ has an effect similar to that of the rear earth components described above. However, when $R^{2+}$ is excessively introduced, high refractivity may be degraded in some cases. In view of this, the total amount of the $R^{2+}$ component preferably falls within a range of from 0% to 10%, more preferably from 0% to 5%, further more preferably from 0% to 3%.

In view of further improving physical properties of the optical glass according to the present embodiment, a suitable combination of the components described above includes, for example, $Ga^{3+}$ component falling within a range of from 0% to 60%, $Al^{3'}$ component falling within a range of from 0%. to 20%, $Si^{4+}$ component falling within a range of from 0% to 30%, and $B^{3+}$ component falling within a range of from 0% to 10%. Further, a $Ti^{4+}$ component falling within a range of from 0% to 20%, a $Nb^{5+}$ component falling within a range of from 0% to 20%; a $W^{6+}$ component falling within a range of from 0% to 10%, and an $R^{2+}$ (R referrers to one or more selected from a group consisting of Mg, Ca, Sr, and Ba) component falling within a range of from 0% to 10% are exemplified.

Further, the optical glass according to the present embodiment enables vitrification even when a component forming a network former oxide is not contained, and excellent physical properties can be provided. In view of this, the optical glass according to the present embodiment can be an optical glass that does not contain a $B^{3+}$ component and a $Si^{4+}$ component substantially, and can be an optical glass containing a total amount of the two components being 0%.

The optical glass according to the present embodiment may further contain other freely selected components as long as the components cause no particular obstruction to achieve the object.

Next, description is made on physical property value of the optical glass according to the present embodiment.

The optical glass according to the present embodiment can be used suitably as a glass regarding a high refractive index region. In view of this, a refractive index ($n_d$) with respect to a d-line (wavelength: 587.562 nm) of the optical glass according to the present embodiment preferably falls within a range of from 1.93 to 2.15, more preferably from 1.95 to 2.12, further more preferably from 1.98 to 2.10.

The optical glass according to the present embodiment is glass having low dispersibility (a high abbe number ($v_d$)). The abbe number ($v_d$) of the optical glass according to the present embodiment preferably falls within a range of from 25 to 40, more preferably from 27 to 37, further more preferably from 29 to 35.

The optical glass according to the present embodiment preferably has $\Delta n_d$, which is expressed by $\Delta n_d = n_d - 0.01023 v_d + 2.2988$, of 0.02 or more, more preferably 0.04 or more, further more preferably 0.06 or more.

Here, $\Delta n_d$ indicates a deviation amount from a reference line connecting two points obtained by plotting an abbe number on a horizontal axis and a refractive index on a vertical axis with respect to two glass types of "J-LASF08" and "J-LASFH16" (both are glass type names produced by HIKARI GLASS Co., Ltd.). $\Delta n_d$ indicates a relationship between low dispersibility ($v_d$) and a high refractive index ($n_d$) of the optical glass according to the present embodiment, and also indicates that the optical glass according to the present embodiment is capable of achieving low dispersibility and a high refractive index in a compatible manner at a high level. When $La^{3+}$, $Y^{3+}$, $Gd^{3+}$, $Zr^{4+}$, $Hf^{4+}$, and $Ta^{5+}$ are introduced, $\Delta n_d$ tends to be high. When $Si^{4+}$, $B^{3+}$, $Al^{3+}$, $Ti^{4+}$, $Nb^{5+}$, and $W^{6+}$ are introduced, $\Delta n_d$ tends to be low.

The optical glass according to the present embodiment is suitable for an optical element such as a lens and the like included in an optical device such as a camera, a microscope, and binocular glasses and the like, and an optical element such as a lens and the like included in an interchangeable camera lens. Among optical devices, a multi-photon microscope is especially suitable.

<Multi-Photon Microscope>

FIG. 1 is a block diagram illustrating an example of a configuration of a multi-photon microscope 1 using the optical glass according to the present embodiment. The multi-photon microscope 1 includes an objective lens 106, a condensing lens 108, and an image forming lens 110 each of which uses the optical glass according to the present embodiment as an optical element. Hereinafter, description is mainly made on the optical system of the multi-photon microscope 1.

A pulse laser device 101 emits ultrashort pulse light having, for example, a near infrared wavelength approximately 1,000 nm) and a pulse width of a femtosecond unit (for example, 100 femtoseconds). In general, ultrashort pulse light immediately after being emitted from the pulse laser device 101 is linearly polarized light that is polarized in a predetermined direction.

A pulse division device 102 divides the ultrashort pulse light, increases a repetition frequency of the ultrashort pulse light, and emits the ultrashort pulse light.

A beam adjustment unit 103 has a function of adjusting a beam diameter of the ultrashort pulse light, which enters from the pulse division device 102, to a pupil diameter of the objective lens 106, a function of adjusting convergence and divergence angles of the ultrashort pulse Light in order to correct chromatic aberration (a focus difference) on an axis of a wavelength of multi-photon excitation light emitted from a sample S and the wavelength of the ultrashort pulse light, a pre-chirp function (group velocity dispersion compensation function) providing inverse group velocity dispersion to the ultrashort pulse light in order to correct the pulse width of the ultrashort pulse light, which is increased due to group velocity dispersion at the time of passing through the optical system, and the like.

The ultrashort pulse light emitted from the pulse laser device 101 have a repetition frequency increased by the pulse division device 102, and is subjected to the above-mentioned adjustments by the beam adjustment unit 103. Furthermore, the ultrashort pulse light emitted from the beam adjustment unit 103 is reflected on a dichroic mirror 104 in a direction toward a dichroic mirror 105, passes through the dichroic mirror 105, is converged by the objective lens 106, and is radiated to the sample S. At this time, an observation surface of the sample S may be scanned with the ultrashort pulse light through use of scanning means (not illustrated).

For example, when the sample S is subjected to fluorescence imaging, a fluorescent pigment by which the sample S is dyed is subjected to multi-photon excitation in an irradiated region with the ultrashort pulse light and the vicinity thereof on the sample S, and fluorescence having a wavelength shorter than an infrared wavelength of the ultrashort pulse light (hereinafter, also referred to "observation light") is emitted.

The observation light emitted from the sample S in a direction toward the objective lens 106 is collimated by the objective lens 106, and is reflected on the dichroic mirror 105 or passes through the dichroic mirror 105 depending on the wavelength.

The observation light reflected on the dichroic mirror 105 enters a fluorescence detection unit 107. For example, the fluorescence detection unit 107 is formed of a barrier filter, a photo multiplier tube (PMT), or the like, receives the observation light reflected on the dichroic mirror 105, and outputs an electronic signal depending on an amount of the light. Further, the fluorescence detection unit 107 detects the observation light over the observation surface of the sample S, in conformity with the ultrashort pulse light scanning on the observation surface of the sample S.

Meanwhile, the observation light passing through the dichroic mirror 105 is de-scanned by scanning means (not illustrated), passes through the dichroic mirror 104, is converged by the condensing lens 108, passes through a pinhole 109 provided at a position substantially conjugate to a focal position of the objective lens 106, passes through the image forming lens 110, and enters a fluorescence detection unit 111. For example, the fluorescence detection unit 111 is formed of a barrier filter, a PMT, or the like, receives the observation light forming an image on a light formed by the image forming lens 110 on the reception surface of the fluorescence detection unit 111, and outputs an electronic signal depending on an amount of the light. Further, the fluorescence detection unit 111 detects the observation light over the observation surface of the sample S, in conformity with the ultrashort pulse light scanning on the observation surface of the sample S.

Note that all the observation light emitted from the sample S in a direction toward the objective lens 106 may be detected by the fluorescence detection unit 111 by excluding the dichroic mirror 105 from the optical path.

Further, the observation light emitted from the sample S in a direction opposite to the objective lens 106 is reflected on a dichroic mirror 112, and enters a fluorescence detection unit 113. The fluorescence detection unit 113 is formed of, for example, a barrier filter, a PMT, or the like, receives the observation light reflected on the dichroic mirror 112, and outputs an electronic signal depending on an amount of the light. Further, the fluorescence detection unit 113 detects the observation light over the observation surface of the sample S, in conformity with the ultrashort pulse light scanning on the observation surface of the sample S.

The electronic signals output from the fluorescence detection units 107, 111, and 113 are input to, for example, a computer (not illustrated). The computer is capable of generating an observation image, displaying the generated observation image, storing data on the observation image, based on the input electronic signals.

<Imaging Device>

Figure 2:
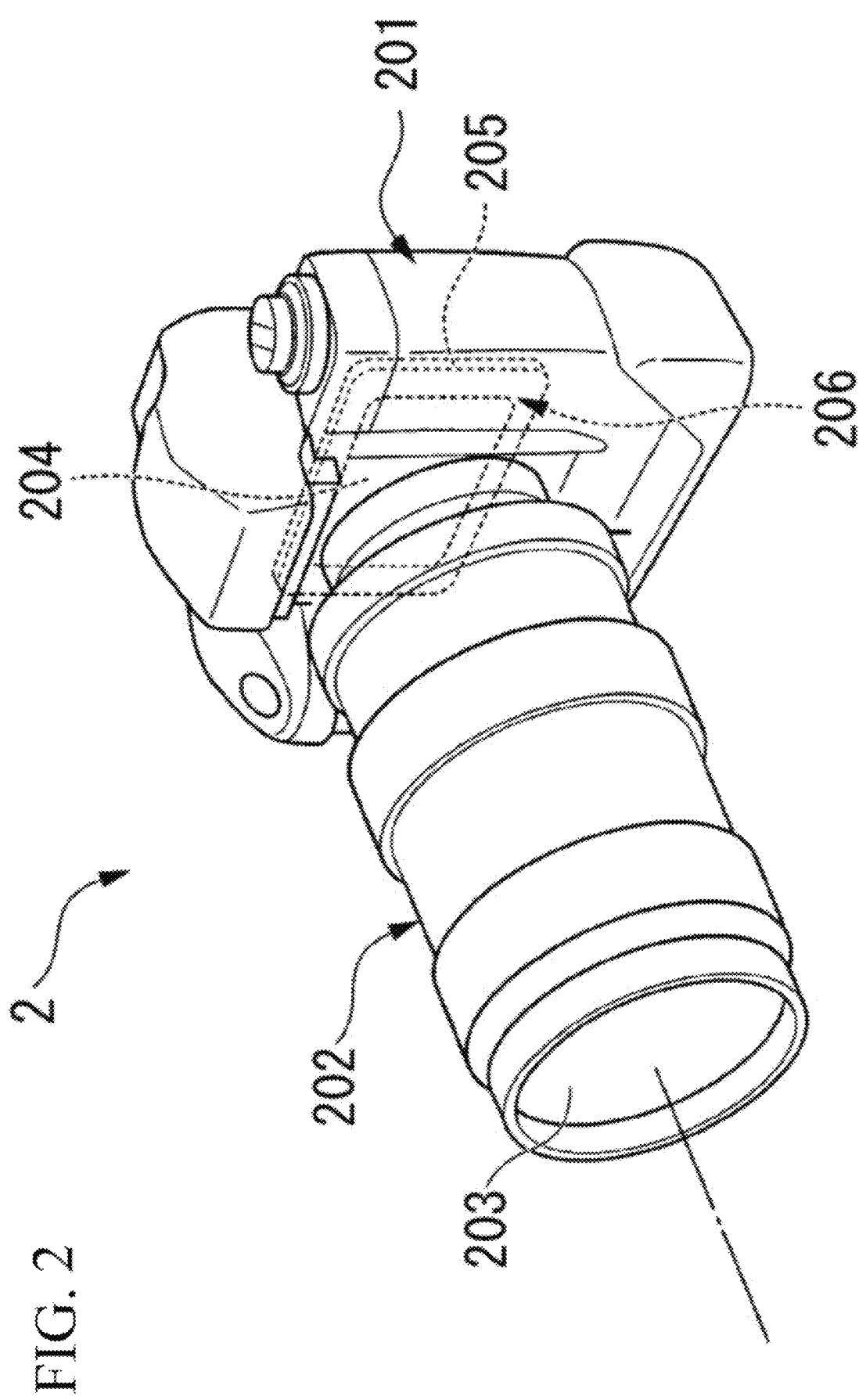
FIG. 2 is a perspective view of an imaging device including the optical element using the optical glass according to the present embodiment.

The optical element using the optical glass according to the present embodiment can be suitably used in an imaging device. FIG. 2 is a perspective view of an imaging device including the optical element using the optical glass according to the present embodiment. An imaging device 2 (optical device) includes a lens 203 (optical element) including the optical glass according to the present embodiment as a base material.

The imaging device 2 is a so-called digital single lens reflex camera, and a lens barrel 202 is removably attached to a lens mount (not illustrated) of a camera body 201. Further, an image is formed with light, which passes through the lens 203 of the lens barrel 202, on a sensor chip (solid-state imaging elements) 204 of a multi-chip module 206 arranged on a back surface side of the camera body 201. The sensor chip 204 is a so-called a bare chip such as a CMOS image sensor and the like. For example, the multi-chip module 206 is a module of a chip-on-glass (COG) type in which the sensor chip 204 is mounted on a glass substrate 205 as a bare chip.

Note that the optical device is not limited to such imaging device, and includes a wide variety of devices such as a projector and the like. The optical element is not limited to the lens, and includes a wide variety of elements such as a prism and the like.

<Method of Manufacturing Optical Glass>

The optical glass according to the present embodiment can be manufactured through use of, for example, a levitation furnace. Examples of the levitation furnace includes an electrostatic type, an electromagnetic type, a sonic type, a magnetic type, a gas-jet type and the like, and are not particularly limited. However, for levitation melting of oxides, a gas-jet type levitation furnace is preferably used. Now, the manufacturing method through use of a gas-jet type levitation furnace is described as one example.

Figure 3A:
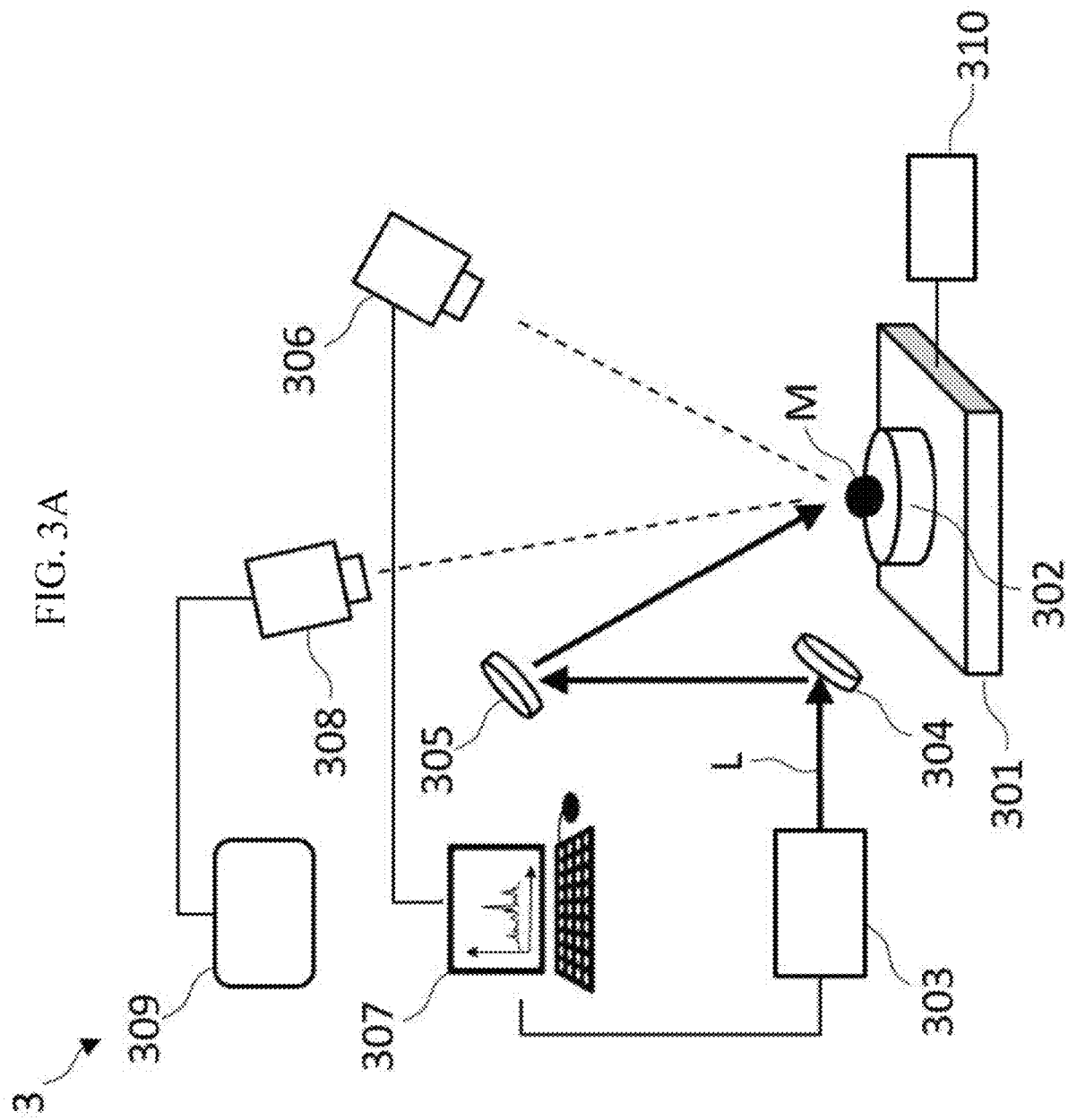
FIG. 3A is a schematic view of an overall configuration of a gas-jet type levitation furnace.
Figure 3B:
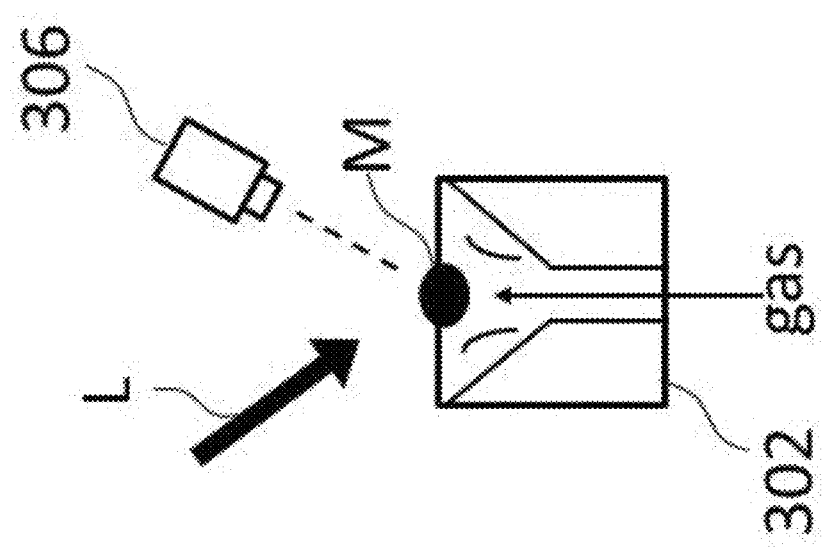
FIG. 3B is an enlarged schematic view of a pedestal on a state of the gas-jet type levitation furnace.

FIG. 3 are schematic views of an overall configuration of a gas-jet type levitation furnace. In the drawings, FIG. 3A is a schematic view of an overall configuration of the levitation furnace, and FIG. 3B is an enlarged schematic view of a pedestal on a state of the gas-jet type Levitation furnace. In a gas-jet type levitation furnace 3, a material M is arranged on a pedestal 302 on a stage 301. Further, the material M is irradiated with laser light L emitted from a laser light source 303 via a mirror 304 and a mirror 305. A temperature of the material M heated by irradiation with the laser light L is monitored with a radiation thermometer 306. Based on temperature information of the material M monitored by the radiation thermometer 306, output of the laser light source 303 is controlled by a computer 307. Further, a state of the material M is imaged by a CCD camera 308, and is output to a monitor 309 (see FIG. 3A). Note that, as the laser light source, a carbon dioxide laser may be used, for example.

In the gas-jet type levitation furnace 3, the material M is in a state of levitation due to gas sent to the pedestal (see FIG. 3B). A flow rate of the gas sent to the pedestal is regulated by a gas flow rate regulator 310. For example, the gas can be jetted through a nozzle having a conical hole formed therein, and non-contact heating can be performed to the material M in a levitation state with the laser light L. When being melted, the material M is formed into a spherical shape or an ellipsoidal shape due to its own surface tension, and levitates in this state. After that, when the laser light L is shut down, the material in a melted state is cooled, and a transparent glass is obtained. Note that, a kind of the gas is not particularly limited, and a publicly-known type may be adopted as appropriate. Oxygen, nitrogen, carbon dioxide, argon, air, and the like are exemplified. Further, the shape of the nozzle and the heating method are not particularly limited, and publicly-known methods can be adopted as appropriate.

It has been difficult to vitrificate the composition of the optical glass according to the present embodiment. For example, in the related art, in a case where an optical glass is manufactured through use of a container such as a crucible and the like that is normally used, it is required to contain a large number of network former oxides such as $SiO_2$, $B_2O_3$, $P_2O_5$, $GeO_2$ and the like to enhance glass formability. For example, rare earth oxides such as $La_2O_3$, $Y_2O_3$, $Gd_2O_3$ and transition metal oxides such as $ZrO_2$, $HfO_2$, $Ta_2O_5$ are not network former oxides. Thus, in a case of a glass composition having a large amount of those components and a small content amount of the network former oxides described above, crystallization starting from a container-melt interface (uneven nucleation) is caused, which prevents vitrification in many cases.

Meanwhile, in the present embodiment, for example, in a case where an optical glass is manufactured by the method through use of the levitation furnace described above, the container and the melt are not held in contact with each other, and hence uneven nucleation is suppressed as much as possible. As a result, glass formation of the melt is largely promoted, and vitrification is enabled even with a composition having a small or no content amount of the network former oxides, which makes it impossible to perform manufacturing by crucible melting. By adopting such manufacturing method, the optical glass according to the present embodiment, which has a composition that cannot be vitrificated in the related art, can be manufactured. The optical glass according to the present embodiment has a high refractive index and a high abbe number. Thus, the present invention is applicable to a glass material having a high refractive index and low dispersibility and a wide-band transmittance material.

EXAMPLES

Next, description is made on Examples and Comparative Examples given below, and the present invention is not limited at all by Examples given below.
(Production of Optical Glasses in Examples)

The optical glasses in Examples were produced through use of the gas-jet type levitation furnace 3 illustrated in FIG. 3A and FIG. 3B in accordance with the following procedure. First, raw materials selected from oxides, hydroxides, carbonates, nitrates, sulfates, and the like were weighted to have a predetermined chemical composition, and then were mixed in an aluminum mortar. The raw materials were subjected to uniaxial pressing at a pressure of 20 MPa, and were formed into a cylindrical pellet. The obtained pellet was baked in an electric furnace at a temperature from 1,000° C. to 1,300° C. in an atmosphere for six to twelve hours, and a sintered body was obtained. The obtained sintered body was roughly crushed, collected by a several tens of milligrams, and placed on the nozzle of the pedestal. Further, the raw material was melted by performing irradiation with the carbon dioxide laser from above while jetting oxygen gas. The melted raw material was formed into a spherical shape or an ellipsoidal shape due to its own surface tension, and was in a levitation state due to a pressure of the gas. The laser output was shut down under a state in which the raw material was completely melted, and the raw material was cooled to obtain glass. Note that, a transparent glass ball having a diameter of from 2 mm to 3 mm was obtained in each Example. In any glasses of Examples, no volatilization that was visually recognizable during melting was confirmed, and no bubbles and devitrification were confirmed.
(Production of Optical Glasses in Comparative Examples)

The optical glasses in Comparative Examples were produced in accordance with the following procedure. First, raw materials selected from oxides, hydroxides, carbonates, nitrates, sulfates, and the like were weighted to have a predetermined chemical composition. Subsequently, the weighted raw materials were mixed and put into a platinum crucible, melted at a temperature of 1,350° C. for approximately an hour, and uniformed by stirring. After that, the temperature was lowered appropriately, and then casting in a die or the like and annealing were performed. In this manner, each sample was obtained.
(Measurement of Refractive Index)

A refractive index of each glass was measured through use of a prism coupler ("2010/M" model, produced by Metricon). A glass sample was polished, a polished surface was held in close contact with a single crystal rutile prism, and a total reflection angle when light having a measurement wavelength entered was measured. In this manner, a refractive index was obtained. Measurement was performed five times at each of three wavelengths of 473 nm, 594.1 nm, and 656 nm, and an average value was given as a measurement value. Further, the obtained actual measurement value was subjecting to fitting by the least-squares method through use of Drude-Voigt's dispersion equation given below, and refractive indexes and abbe numbers $(v_d)$ on a d-line (587.562 nm), an F-line (486.133 nm), and a C-line (656.273 nm) were calculated. Note that, a value of each refractive index is shown truncating the numbers beyond the fourth decimal point.

$$\frac{1}{n^2-1} = \frac{\pi m c^2}{e^2 Nf}\left(\frac{1}{\lambda_0^2} - \frac{1}{\lambda^2}\right) \quad \text{[Math. 1]}$$

(n: a refractive index, m: an electron mass, c: light velocity, e: an elementary charge, N: the number of molecules per unit volume,
f: oscillator strength, $\lambda_0$: an intrinsic resonance wavelength, $\lambda$: a wavelength).

Further, an abbe number $(v_d)$ is defined in the following expression.

$$v_d = \frac{n_d - 1}{n_F - n_C} \quad \text{[Math. 2]}$$

A component composition (in terms of mol % of cations), a refractive index ($n_d$), an abbe number ($v_d$), and $\Delta n_d$ of each of the optical glasses in Examples and Comparative Examples are shown in the tables. Formation of a reference line of $\Delta n_d = n_d - 0.01023 v_d + 2.2988$ or the like can be successfully performed in accordance with the method of forming a reference line described above. Two glass types of "J-LASF08" and "J-LASFH16" (both are glass type names produced by HIKARI GLASS Co., Ltd.) having different abbe numbers ($v_d$) and refractive indexes ($n_d$) can be adopted as reference materials, and the reference line can be successfully formed based on those values.

TABLE 1

|  | Example 1 | Example 2 | Example 3 | Example 4 | Example 5 |
|---|---|---|---|---|---|
| $Si^{4+}$ | 24.26 | 23.55 | 24.26 | 23.10 | 24.26 |
| $B^{3+}$ |  |  |  |  |  |
| $Al^{3+}$ |  |  |  |  |  |
| $Ga^{3+}$ | 1.75 | 1.70 | 1.75 | 1.67 | 1.75 |
| $Mg^{2+}$ |  |  |  |  |  |
| $Ca^{2+}$ |  |  |  |  |  |
| $Sr^{2+}$ |  |  |  |  |  |
| $Ba^{2+}$ |  |  |  |  |  |
| $La^{3+}$ | 38.79 | 37.66 | 38.79 | 41.71 | 43.79 |
| $Y^{3+}$ |  |  |  |  |  |
| $Gd^{3+}$ | 12.65 | 12.29 | 12.65 | 12.05 | 7.65 |
| $Ti^{4+}$ |  |  |  |  |  |
| $Zr^{4+}$ | 8.21 | 10.88 | 4.21 | 7.82 | 8.21 |
| $Hf^{4+}$ |  |  | 4.00 |  |  |
| $Nb^{5+}$ |  |  |  |  |  |
| $Ta^{5+}$ | 14.33 | 13.92 | 14.33 | 13.65 | 14.33 |
| $W^{6+}$ |  |  |  |  |  |
| Total | 100.00 | 100.00 | 100.00 | 100.00 | 100.00 |
| $La^{3+} + Y^{3+} + Gd^{3+}$ | 51.45 | 49.95 | 51.45 | 53.76 | 51.45 |
| $Zr^{4+} + Hf^{4+} + Ta^{5+}$ | 22.54 | 24.80 | 22.54 | 21.47 | 22.54 |
| $(La^{3+} + Y^{3+} + Gd^{3+}) \times (Zr^{4+} + Hf^{4+} + Ta^{5+})$ (%)$^2$ | 1160 | 1239 | 1160 | 1154 | 1160 |
| $n_d$ | 1.9619 | 1.9685 | 1.9580 | 1.9656 | 1.9622 |
| $\mu_d$ | 37.5 | 37.0 | 38.2 | 38.1 | 37.5 |
| $\Delta n_d$ | 0.0464 | 0.0479 | 0.0502 | 0.0560 | 0.0472 |

TABLE 2

|  | Example 6 | Example 7 | Example 8 | Example 9 | Example 10 |
|---|---|---|---|---|---|
| $Si^{4+}$ | 22.05 | 23.10 | 22.05 | 23.10 | 23.10 |
| $B^{3+}$ | 9.09 |  |  |  |  |
| $Al^{3+}$ |  | 4.76 |  |  |  |
| $Ga^{3+}$ | 1.59 | 1.67 | 10.69 | 1.67 | 1.67 |
| $Mg^{2+}$ |  |  |  | 4.76 |  |
| $Ca^{2+}$ |  |  |  |  | 4.76 |
| $Sr^{2+}$ |  |  |  |  |  |
| $Ba^{2+}$ |  |  |  |  |  |
| $La^{3+}$ | 35.27 | 36.95 | 35.27 | 36.95 | 36.95 |
| $Y^{3+}$ |  |  |  |  |  |
| $Gd^{3+}$ | 11.50 | 12.05 | 11.50 | 12.05 | 12.05 |
| $Ti^{4+}$ |  |  |  |  |  |
| $Zr^{4+}$ | 7.46 | 7.82 | 7.46 | 7.82 | 7.82 |
| $Hf^{4+}$ |  |  |  |  |  |
| $Nb^{5+}$ |  |  |  |  |  |
| $Ta^{5+}$ | 13.03 | 13.65 | 13.03 | 13.65 | 13.65 |
| $W^{6+}$ |  |  |  |  |  |
| Total | 100.00 | 100.00 | 100.00 | 100.00 | 100.00 |
| $La^{3+} + Y^{3+} + Gd^{3+}$ | 46.77 | 49.00 | 46.77 | 49.00 | 49.00 |
| $Zr^{4+} + Hf^{4+} + Ta^{5+}$ | 20.49 | 21.47 | 20.49 | 21.47 | 21.47 |
| $(La^{3+} + Y^{3+} + Gd^{3+}) \times (Zr^{4+} + Hf^{4+} + Ta^{5+})$ (%)$^2$ | 958.4 | 1052 | 958.4 | 1052 | 1052 |
| $n_d$ | 1.9363 | 1.9501 | 1.9549 | 1.9564 | 1.9544 |
| $\mu_d$ | 38.3 | 38.6 | 37.6 | 38.3 | 38.7 |
| $\Delta n_d$ | 0.0295 | 0.0465 | 0.0409 | 0.0489 | 0.0517 |

TABLE 3

|  | Example 11 | Example 12 | Example 13 | Example 14 | Example 15 |
|---|---|---|---|---|---|
| $Si^{4+}$ | 23.10 | 23.10 | 23.10 | 23.10 | 23.10 |
| $B^{3+}$ | | | | | |
| $Al^{3+}$ | | | | | |
| $Ga^{3+}$ | 1.67 | 1.67 | 1.67 | 1.67 | 1.67 |
| $Mg^{2+}$ | | | | | |
| $Ca^{2+}$ | | | | | |
| $Sr^{2+}$ | 4.76 | | | | |
| $Ba^{2+}$ | | 4.76 | | | |
| $La^{3+}$ | 36.95 | 36.95 | 36.95 | 36.95 | 36.95 |
| $Y^{3+}$ | | | 4.76 | | |
| $Gd^{3+}$ | 12.05 | 12.05 | 12.05 | 16.81 | 12.05 |
| $Ti^{4+}$ | | | | | 4.76 |
| $Zr^{4+}$ | 7.82 | 7.82 | 7.82 | 7.82 | 7.82 |
| $Hf^{4+}$ | | | | | |
| $Nb^{5+}$ | | | | | |
| $Ta^{5+}$ | 13.65 | 13.65 | 13.65 | 13.65 | 13.65 |
| $W^{6+}$ | | | | | |
| Total | 100.00 | 100.00 | 100.00 | 100.00 | 100.00 |
| $La^{3+} + Y^{3+} + Gd^{3+}$ | 49.00 | 49.00 | 53.76 | 53.76 | 49.00 |
| $Zr^{4+} + Hf^{4+} + Ta^{5+}$ | 21.47 | 21.47 | 21.47 | 21.47 | 21.47 |
| $(La^{3+} + Y^{3+} + Gd^{3+}) \times (Zr^{4+} + Hf^{4+} + Ta^{5+})$ (%)$^2$ | 1052 | 1052 | 1154 | 1154 | 1052 |
| $n_d$ | 1.9516 | 1.9508 | 1.9621 | 1.9657 | 1.9809 |
| $\mu_d$ | 38.3 | 37.1 | 37.7 | 37.7 | 35.0 |
| $\Delta n_d$ | 0.0445 | 0.0316 | 0.0487 | 0.0526 | 0.0403 |

TABLE 4

|  | Example 16 | Example 17 | Example 18 | Example 19 | Example 20 |
|---|---|---|---|---|---|
| $Si^{4+}$ | 25.27 | 23.10 | 23.10 | | |
| $B^{3+}$ | | | | | |
| $Al^{3+}$ | | | | | |
| $Ga^{3+}$ | 1.83 | 1.67 | 1.67 | 35.00 | 10.00 |
| $Mg^{2+}$ | | | | | |
| $Ca^{2+}$ | | | | | |
| $Sr^{2+}$ | | | | | |
| $Ba^{2+}$ | | | | | |
| $La^{3+}$ | 40.41 | 36.95 | 36.95 | 55.00 | 60.00 |
| $Y^{3+}$ | | | | | |
| $Gd^{3+}$ | 13.18 | 12.05 | 12.05 | | |
| $Ti^{4+}$ | | | | | |
| $Zr^{4+}$ | 4.38 | 7.82 | 7.82 | | |
| $Hf^{4+}$ | | | | | |
| $Nb^{5+}$ | | 4.76 | | | |
| $Ta^{5+}$ | 14.93 | 13.65 | 18.41 | 10.00 | 30.00 |
| $W^{6+}$ | | | | | |
| Total | 100.00 | 100.00 | 100.00 | 100.00 | 100.00 |
| $La^{3+} + Y^{3+} + Gd^{3+}$ | 53.59 | 49.00 | 49.00 | 55.00 | 60.00 |
| $Zr^{4+} + Hf^{4+} + Ta^{5+}$ | 19.31 | 21.47 | 26.23 | 10.00 | 30.00 |
| $(La^{3+} + Y^{3+} + Gd^{3+}) \times (Zr^{4+} + Hf^{4+} + Ta^{5+})$ (%)$^2$ | 1035 | 1052 | 1285 | 550.0 | 1800 |
| $n_d$ | 1.9542 | 1.9749 | 1.9803 | 2.0028 | 2.0825 |
| $\mu_d$ | 38.2 | 35.9 | 35.5 | 32.7 | 30.4 |
| $\Delta n_d$ | 0.0464 | 0.0428 | 0.0448 | 0.0382 | 0.0949 |

TABLE 5

|  | Example 21 | Example 22 | Example 23 | Example 24 | Example 25 |
|---|---|---|---|---|---|
| $Si^{4+}$ | 9.33 | 13.04 | 12.03 | 13.04 | 7.03 |
| $B^{3+}$ | | | | | |
| $Al^{3+}$ | | | | | |
| $Ga^{3+}$ | 40.39 | 16.67 | 23.08 | 16.67 | 28.08 |
| $Mg^{2+}$ | | | | | |

TABLE 5-continued

|  | Example 21 | Example 22 | Example 23 | Example 24 | Example 25 |
|---|---|---|---|---|---|
| $Ca^{2+}$ |  |  |  |  |  |
| $Sr^{2+}$ |  |  |  |  |  |
| $Ba^{2+}$ |  | 0.48 | 0.44 |  | 0.44 |
| $La^{3+}$ | 26.36 | 36.38 | 33.58 | 36.85 | 33.58 |
| $Y^{3+}$ |  |  |  |  |  |
| $Gd^{3+}$ | 8.60 | 12.03 | 11.10 | 12.02 | 11.10 |
| $Ti^{4+}$ |  |  |  |  |  |
| $Zr^{4+}$ | 5.58 | 7.80 | 7.20 | 7.80 | 7.20 |
| $Hf^{4+}$ |  |  |  |  |  |
| $Nb^{5+}$ | 0.80 | 1.11 | 1.03 | 1.11 | 1.03 |
| $Ta^{5+}$ | 8.95 | 12.04 | 11.11 | 12.51 | 11.11 |
| $W^{6+}$ |  | 0.47 | 0.43 |  | 0.43 |
| Total | 100.00 | 100.00 | 100.00 | 100.00 | 100.00 |
| $La^{3+} + Y^{3+} + Gd^{3+}$ | 34.96 | 48.40 | 44.68 | 48.87 | 44.68 |
| $Zr^{4+} + Hf^{4+} + Ta^{5+}$ | 14.52 | 19.83 | 18.31 | 20.30 | 18.31 |
| $(La^{3+} + Y^{3+} + Gd^{3+}) \times (Zr^{4+} + Hf^{4+} + Ta^{5+})$ $(\%)^2$ | 507.7 | 960.1 | 818.1 | 992.2 | 818.1 |
| $n_d$ | 1.9580 | 1.9914 | 1.9847 | 1.9937 | 2.0005 |
| $\mu_d$ | 35.6 | 34.7 | 33.0 | 35.2 | 32.5 |
| $\Delta n_d$ | 0.0228 | 0.0472 | 0.0236 | 0.0545 | 0.0345 |

TABLE 6

|  | Example 26 | Example 27 | Example 28 | Example 29 | Example 30 |
|---|---|---|---|---|---|
| $Si^{4+}$ | 4.55 | 5.79 |  |  | 2.28 |
| $B^{3+}$ |  |  |  |  |  |
| $Al^{3+}$ |  |  |  |  |  |
| $Ga^{3+}$ | 42.52 | 36.03 | 47.07 | 53.97 | 48.24 |
| $Mg^{2+}$ |  |  |  |  |  |
| $Ca^{2+}$ |  |  |  |  |  |
| $Sr^{2+}$ |  |  |  |  |  |
| $Ba^{2+}$ | 0.36 | 0.40 | 0.36 | 0.32 | 0.34 |
| $La^{3+}$ | 27.39 | 30.11 | 27.39 | 23.82 | 25.60 |
| $Y^{3+}$ |  |  |  |  |  |
| $Gd^{3+}$ | 9.06 | 9.95 | 9.06 | 7.87 | 8.46 |
| $Ti^{4+}$ |  |  |  |  |  |
| $Zr^{4+}$ | 5.87 | 6.45 | 5.87 | 5.10 | 5.49 |
| $Hf^{4+}$ |  |  |  |  |  |
| $Nb^{5+}$ | 0.84 | 0.92 | 0.84 | 0.73 | 0.78 |
| $Ta^{5+}$ | 9.07 | 9.96 | 9.07 | 7.88 | 8.47 |
| $W^{6+}$ | 0.35 | 0.39 | 0.35 | 0.30 | 0.33 |
| Total | 100.00 | 100.00 | 100.00 | 100.00 | 100.00 |
| $La^{3+} + Y^{3+} + Gd^{3+}$ | 36.45 | 40.06 | 36.45 | 31.69 | 34.07 |
| $Zr^{4+} + Hf^{4+} + Ta^{5+}$ | 14.94 | 16.42 | 14.94 | 12.99 | 13.96 |
| $(La^{3+} + Y^{3+} + Gd^{3+}) \times (Zr^{4+} + Hf^{4+} + Ta^{5+})$ $(\%)^2$ | 544.3 | 657.6 | 544.3 | 411.6 | 475.7 |
| $n_d$ | 1.9847 | 1.9922 | 2.0032 | 1.9889 | 1.9858 |
| $\mu_d$ | 33.3 | 33.3 | 32.1 | 32.6 | 32.8 |
| $\Delta n_d$ | 0.0263 | 0.0335 | 0.0331 | 0.0230 | 0.0229 |

TABLE 7

|  | Example 31 | Example 32 | Example 33 | Example 34 | Example 35 |
|---|---|---|---|---|---|
| $Si^{4+}$ | 2.78 | 2.53 |  |  |  |
| $B^{3+}$ |  |  |  |  |  |
| $Al^{3+}$ |  |  |  |  |  |
| $Ga^{3+}$ | 37.47 | 42.85 | 15.00 | 30.00 | 40.00 |
| $Mg^{2+}$ |  |  |  |  |  |
| $Ca^{2+}$ |  |  |  |  |  |
| $Sr^{2+}$ |  |  |  |  |  |
| $Ba^{2+}$ | 0.41 | 0.37 |  |  |  |
| $La^{3+}$ | 30.92 | 28.26 | 55.00 | 40.00 | 20.00 |
| $Y^{3+}$ |  |  |  |  |  |

TABLE 7-continued

|  | Example 31 | Example 32 | Example 33 | Example 34 | Example 35 |
|---|---|---|---|---|---|
| $Gd^{3+}$ | 10.22 | 9.34 | | | |
| $Ti^{4+}$ | | | | | |
| $Zr^{4+}$ | 6.63 | 6.06 | | | |
| $Hf^{4+}$ | | | | | |
| $Nb^{5+}$ | 0.95 | 0.86 | | | |
| $Ta^{5+}$ | 10.23 | 9.35 | 30.00 | 30.00 | 40.00 |
| $W^{6+}$ | 0.40 | 0.36 | | | |
| Total | 100.00 | 100.00 | 100.00 | 100.00 | 100.00 |
| $La^{3+} + Y^{3+} + Gd^{3+}$ | 41.14 | 37.61 | 55.00 | 40.00 | 20.00 |
| $Zr^{4+} + Hf^{4+} + Ta^{5+}$ | 16.86 | 15.41 | 30.00 | 30.00 | 40.00 |
| $(La^{3+} + Y^{3+} + Gd^{3+}) \times (Zr^{4+} + Hf^{4+} + Ta^{5+})$ (%)$^2$ | 693.7 | 579.5 | 1650 | 1200 | 800.0 |
| $n_d$ | 2.0057 | 1.9958 | 2.0791 | 2.0607 | 2.0636 |
| $\mu_d$ | 31.8 | 32.5 | 31.4 | 31.1 | 28.8 |
| $\Delta n_d$ | 0.0325 | 0.0297 | 0.1019 | 0.0802 | 0.0597 |

TABLE 8

|  | Example 36 | Example 37 | Example 38 | Example 39 | Example 40 |
|---|---|---|---|---|---|
| $Si^{4+}$ | | 18.04 | 24.26 | 19.24 | |
| $B^{3+}$ | | | | | |
| $Al^{3+}$ | | | | | |
| $Ga^{3+}$ | 20.00 | 11.67 | 1.75 | 5.42 | 40.00 |
| $Mg^{2+}$ | | | | | |
| $Ca^{2+}$ | | | | | |
| $Sr^{2+}$ | | | | | |
| $Ba^{2+}$ | | | | | |
| $La^{3+}$ | 30.00 | 36.85 | 38.79 | 39.50 | 50.00 |
| $Y^{3+}$ | | | | | |
| $Gd^{3+}$ | | 12.02 | 12.65 | 12.89 | |
| $Ti^{4+}$ | | | | | |
| $Zr^{4+}$ | | 7.80 | 8.21 | 8.36 | |
| $Hf^{4+}$ | | | | | |
| $Nb^{5+}$ | | 1.11 | 1.17 | 1.19 | |
| $Ta^{5+}$ | 50.00 | 12.51 | 13.16 | 13.40 | 10.00 |
| $W^{6+}$ | | | | | |
| Total | 100.00 | 100.00 | 100.00 | 100.00 | 100.00 |
| $La^{3+} + Y^{3+} + Gd^{3+}$ | 30.00 | 48.87 | 51.45 | 52.39 | 50.00 |
| $Zr^{4+} + Hf^{4+} + Ta^{5+}$ | 50.00 | 20.30 | 21.37 | 21.76 | 10.00 |
| $(La^{3+} + Y^{3+} + Gd^{3+}) \times (Zr^{4+} + Hf^{4+} + Ta^{5+})$ (%)$^2$ | 1500 | 992.2 | 1099 | 1140 | 500.0 |
| $n_d$ | 2.1152 | 1.9779 | 1.9621 | 1.9828 | 1.9966 |
| $\mu_d$ | 28.1 | 35.7 | 36.9 | 35.9 | 33.4 |
| $\Delta n_d$ | 0.1039 | 0.0445 | 0.0409 | 0.0515 | 0.0398 |

TABLE 9

|  | Example 41 | Example 42 | Example 43 | Example 44 | Example 45 |
|---|---|---|---|---|---|
| $Si^{4+}$ | | | | | |
| $B^{3+}$ | | | | | |
| $Al^{3+}$ | | | | | |
| $Ga^{3+}$ | 30.00 | 50.00 | 40.00 | 25.00 | 10.00 |
| $Mg^{2+}$ | | | | | |
| $Ca^{2+}$ | | | | | |
| $Sr^{2+}$ | | | | | |
| $Ba^{2+}$ | | | | | |
| $La^{3+}$ | 50.00 | 40.00 | 40.00 | 55.00 | 30.00 |
| $Y^{3+}$ | | | | | |
| $Gd^{3+}$ | | | | | |
| $Ti^{4+}$ | | | | | |
| $Zr^{4+}$ | | | | | |
| $Hf^{4+}$ | | | | | |
| $Nb^{5+}$ | | | | | |
| $Ta^{5+}$ | 20.00 | 10.00 | 20.00 | 20.00 | 60.00 |
| $W^{6+}$ | | | | | |
| Total | 100.00 | 100.00 | 100.00 | 100.00 | 100.00 |

TABLE 9-continued

|  | Example 41 | Example 42 | Example 43 | Example 44 | Example 45 |
|---|---|---|---|---|---|
| $La^{3+} + Y^{3+} + Gd^{3+}$ | 50.00 | 40.00 | 40.00 | 55.00 | 30.00 |
| $Zr^{4+} + Hf^{4+} + Ta^{5+}$ | 20.00 | 10.00 | 20.00 | 20.00 | 60.00 |
| $(La^{3+} + Y^{3+} + Gd^{3+}) \times (Zr^{4+} + Hf^{4+} + Ta^{5+})$ (%)$^2$ | 1000 | 400.0 | 800.0 | 1100 | 1800 |
| $n_d$ | 2.0355 | 1.9836 | 2.0225 | 2.0421 | 2.1459 |
| $\mu_d$ | 32.6 | 33.4 | 32.4 | 32.3 | 26.9 |
| $\Delta n_d$ | 0.0700 | 0.0266 | 0.0545 | 0.0734 | 0.1219 |

TABLE 10

|  | Example 46 | Example 47 | Example 48 | Example 49 | Example 50 |
|---|---|---|---|---|---|
| $Si^{4+}$ |  |  |  |  |  |
| $B^{3+}$ |  |  |  |  |  |
| $Al^{3+}$ |  |  |  |  |  |
| $Ga^{3+}$ | 40.00 | 30.00 | 20.00 | 30.00 | 50.00 |
| $Mg^{2+}$ |  |  |  |  |  |
| $Ca^{2+}$ |  |  |  |  |  |
| $Sr^{2+}$ |  |  |  |  |  |
| $Ba^{2+}$ |  |  |  |  |  |
| $La^{3+}$ | 30.00 | 30.00 | 50.00 | 20.00 | 20.00 |
| $Y^{3+}$ |  |  |  |  |  |
| $Gd^{3+}$ |  |  |  |  |  |
| $Ti^{4+}$ |  |  |  |  |  |
| $Zr^{4+}$ |  |  |  |  |  |
| $Hf^{4+}$ |  |  |  |  |  |
| $Nb^{5+}$ |  |  |  |  |  |
| $Ta^{5+}$ | 30.00 | 40.00 | 30.00 | 50.00 | 30.00 |
| $W^{6+}$ |  |  |  |  |  |
| Total | 100.00 | 100.00 | 100.00 | 100.00 | 100.00 |
| $La^{3+} + Y^{3+} + Gd^{3+}$ | 30.00 | 30.00 | 50.00 | 20.00 | 20.00 |
| $Zr^{4+} + Hf^{4+} + Ta^{5+}$ | 30.00 | 40.00 | 30.00 | 50.00 | 30.00 |
| $(La^{3+} + Y^{3+} + Gd^{3+}) \times (Zr^{4+} + Hf^{4+} + Ta^{5+})$ (%)$^2$ | 900.0 | 1200 | 1500 | 1000 | 600.0 |
| $n_d$ | 2.0432 | 2.0843 | 2.0714 | 2.0981 | 2.0255 |
| $\mu_d$ | 30.9 | 29.3 | 31.5 | 27.3 | 30.1 |
| $\Delta n_d$ | 0.0603 | 0.0853 | 0.0949 | 0.0782 | 0.0344 |

TABLE 11

|  | Example 51 | Example 52 | Example 53 | Example 54 | Example 55 |
|---|---|---|---|---|---|
| $Si^{4+}$ |  |  |  |  |  |
| $B^{3+}$ |  |  |  |  |  |
| $Al^{3+}$ |  |  |  |  |  |
| $Ga^{3+}$ | 20.00 | 40.00 | 50.00 | 20.00 | 20.00 |
| $Mg^{2+}$ |  |  |  |  |  |
| $Ca^{2+}$ |  |  |  |  |  |
| $Sr^{2+}$ |  |  |  |  |  |
| $Ba^{2+}$ |  |  |  |  |  |
| $La^{3+}$ | 20.00 | 10.00 | 10.00 | 50.00 | 50.00 |
| $Y^{3+}$ |  |  |  |  |  |
| $Gd^{3+}$ |  |  |  |  |  |
| $Ti^{4+}$ |  |  |  |  |  |
| $Zr^{4+}$ |  |  |  | 5.00 |  |
| $Hf^{4+}$ |  |  |  |  |  |
| $Nb^{5+}$ |  |  |  |  | 5.00 |
| $Ta^{5+}$ | 60.00 | 50.00 | 40.00 | 25.00 | 25.00 |
| $W^{6+}$ |  |  |  |  |  |
| Total | 100.00 | 100.00 | 100.00 | 100.00 | 100.00 |
| $La^{3+} + Y^{3+} + Gd^{3+}$ | 20.00 | 10.00 | 10.00 | 50.00 | 50.00 |
| $Zr^{4+} + Hf^{4+} + Ta^{5+}$ | 60.00 | 50.00 | 40.00 | 30.00 | 25.00 |

TABLE 11-continued

|  | Example 51 | Example 52 | Example 53 | Example 54 | Example 55 |
|---|---|---|---|---|---|
| $(La^{3+} + Y^{3+} + Gd^{3+}) \times (Zr^{4+} + Hf^{4+} + Ta^{5+})$ (%)$^2$ | 1200 | 500.0 | 400.0 | 1500 | 1250 |
| $n_d$ | 2.1340 | 2.0873 | 2.0483 | 2.0689 | 2.0803 |
| $\mu_d$ | 25.8 | 26.0 | 28.2 | 31.7 | 29.1 |
| $\Delta n_d$ | 0.0988 | 0.0548 | 0.0381 | 0.0943 | 0.0786 |

TABLE 12

|  | Example 56 | Example 57 | Example 58 | Example 59 | Example 60 |
|---|---|---|---|---|---|
| $Si^{4+}$ | 5.00 | | | | |
| $B^{3+}$ | | 5.00 | | | |
| $Al^{3+}$ | | | 10.00 | 20.00 | 20.00 |
| $Ga^{3+}$ | 15.00 | 15.00 | | | |
| $Mg^{2+}$ | | | | | |
| $Ca^{2+}$ | | | | | |
| $Sr^{2+}$ | | | | | |
| $Ba^{2+}$ | | | | | |
| $La^{3+}$ | 50.00 | 50.00 | 60.00 | 50.00 | 30.00 |
| $Y^{3+}$ | | | | | |
| $Gd^{3+}$ | | | | | |
| $Ti^{4+}$ | | | | | |
| $Zr^{4+}$ | | | | | |
| $Hf^{4+}$ | | | | | |
| $Nb^{5+}$ | | | | | |
| $Ta^{5+}$ | 30.00 | 30.00 | 30.00 | 30.00 | 50.00 |
| $W^{6+}$ | | | | | |
| Total | 100.00 | 100.00 | 100.00 | 100.00 | 100.00 |
| $La^{3+} + Y^{3+} + Gd^{3+}$ | 50.00 | 50.00 | 60.00 | 50.00 | 30.00 |
| $Zr^{4+} + Hf^{4+} + Ta^{5+}$ | 30.00 | 30.00 | 30.00 | 30.00 | 50.00 |
| $(La^{3+} + Y^{3+} + Gd^{3+}) \times (Zr^{4+} + Hf^{4+} + Ta^{5+})$ (%)$^2$ | 1500 | 1500 | 1800 | 1500 | 1500 |
| $n_d$ | 2.0563 | 2.0765 | 2.0671 | 2.0364 | 2.0779 |
| $\mu_d$ | 31.5 | 31.3 | 32.1 | 33.1 | 29.5 |
| $\Delta n_d$ | 0.0792 | 0.0975 | 0.0965 | 0.0760 | 0.0803 |

TABLE 13

|  | Comparative Example 1 | Comparative Example 2 | Comparative Example 3 | Comparative Example 4 | Comparative Example 5 |
|---|---|---|---|---|---|
| $Si^{4+}$ | 13.44 | 13.66 | 13.37 | 13.51 | 13.34 |
| $B^{3+}$ | 41.07 | 39.03 | 38.21 | 38.60 | 38.12 |
| $Ba^{2+}$ | | | | | |
| $Zn^{2+}$ | | | | | |
| $Y^{3+}$ | 2.26 | 3.48 | 5.49 | 4.62 | 5.74 |
| $La^{3+}$ | 23.85 | 25.96 | 25.65 | 25.68 | 25.35 |
| $Gd^{3+}$ | 7.76 | 8.20 | 7.68 | 8.11 | 8.01 |
| $Ti^{4+}$ | | | | | |
| $Zr^{4+}$ | 4.46 | 3.25 | 3.31 | 3.21 | 3.17 |
| $Nb^{5+}$ | | | | | |
| $Ta^{5+}$ | 7.09 | 6.08 | 5.96 | 5.96 | 5.94 |
| $W^{6+}$ | | 0.27 | 0.26 | 0.24 | 0.26 |
| $Sb^{3+}$ | 0.07 | 0.07 | 0.07 | 0.07 | 0.07 |
| Total | 100.00 | 100.00 | 100.00 | 100.00 | 100.00 |
| $La^{3+} + Y^{3+} + Gd^{3+}$ | 33.87 | 37.64 | 38.82 | 38.41 | 39.10 |
| $Zr^{4+} + Hf^{4+} + Ta^{5+}$ | 11.55 | 9.33 | 9.27 | 9.17 | 9.11 |
| $(La^{3+} + Y^{3+} + Gd^{3+}) \times (Zr^{4+} + Hf^{4+} + Ta^{5+})$ (%)$^2$ | 391 | 351 | 360 | 352 | 356 |
| $n_d$ | 1.842252 | 1.846337 | 1.849617 | 1.847521 | 1.849599 |
| $\mu_d$ | 43.34 | 43.77 | 43.74 | 43.83 | 43.74 |
| $\Delta n_d$ | −0.0133 | −0.0049 | −0.0019 | −0.0031 | −0.0019 |

TABLE 14

|  | Comparative Example 6 | Comparative Example 7 | Comparative Example 8 | Comparative Example 9 | Comparative Example 10 |
|---|---|---|---|---|---|
| $Si^{4+}$ | 13.50 | 12.93 | 13.41 | 13.10 | 12.93 |
| $B^{3+}$ | 38.56 | 38.10 | 38.30 | 40.04 | 39.53 |
| $Ba^{2+}$ | | | | | |
| $Zn^{2+}$ | 1.18 | | | | |
| $Y^{3+}$ | 3.44 | 4.13 | 5.01 | 2.38 | 2.89 |
| $La^{3+}$ | 25.65 | 26.72 | 24.73 | 25.16 | 25.58 |
| $Gd^{3+}$ | 8.11 | 8.29 | 8.04 | 8.19 | 8.08 |
| $Ti^{4+}$ | | | | | |
| $Zr^{4+}$ | 3.21 | 3.27 | 4.84 | 4.71 | 4.65 |
| $Nb^{5+}$ | | | | | |
| $Ta^{5+}$ | 6.01 | 6.00 | 5.12 | 6.07 | 6.00 |
| $W^{6+}$ | 0.27 | 0.49 | 0.48 | 0.27 | 0.27 |
| $Sb^{3+}$ | 0.07 | 0.07 | 0.07 | 0.08 | 0.07 |
| Total | 100.00 | 100.00 | 100.00 | 100.00 | 100.00 |
| $La^{3+} + Y^{3+} + Gd^{3+}$ | 37.20 | 39.14 | 37.78 | 35.73 | 36.55 |
| $Zr^{4+} + Hf^{4+} + Ta^{5+}$ | 9.22 | 9.27 | 9.96 | 10.78 | 10.65 |
| $(La^{3+} + Y^{3+} + Gd^{3+}) \times (Zr^{4+} + Hf^{4+} + Ta^{5+})$ $(\%)^2$ | 343 | 363 | 376 | 385 | 389 |
| $n_d$ | 1.846673 | 1.851615 | 1.850286 | 1.848175 | 1.851059 |
| $\mu_d$ | 43.72 | 43.40 | 43.50 | 43.38 | 43.37 |
| $\Delta n_d$ | −0.0050 | −0.0033 | −0.0037 | −0.0070 | −0.0042 |

TABLE 15

|  | Comparative Example 11 | Comparative Example 12 | Comparative Example 13 | Comparative Example 14 |
|---|---|---|---|---|
| $Si^{4+}$ | 12.89 | 13.50 | 13.42 | 7.21 |
| $B^{3+}$ | 39.42 | 38.56 | 38.34 | 21.14 |
| $Ba^{2+}$ | | | | 5.93 |
| $Zn^{2+}$ | | | | 3.39 |
| $Y^{3+}$ | 3.42 | 3.44 | 5.02 | |
| $La^{3+}$ | 25.52 | 25.65 | 24.75 | 23.22 |
| $Gd^{3+}$ | 8.06 | 8.10 | 8.06 | |
| $Ti^{4+}$ | | | | 25.61 |
| $Zr^{4+}$ | 4.37 | 4.39 | 4.63 | |
| $Nb^{5+}$ | | | | 5.80 |
| $Ta^{5+}$ | 5.98 | 6.01 | 5.23 | 7.67 |
| $W^{6+}$ | 0.27 | 0.27 | 0.48 | |
| $Sb^{3+}$ | 0.07 | 0.08 | 0.07 | 0.03 |
| Total | 100.00 | 100.00 | 100.00 | 100.00 |
| $La^{3+} + Y^{3+} + Gd^{3+}$ | 37.00 | 37.19 | 37.83 | 23.22 |
| $Zr^{4+} + Hf^{4+} + Ta^{5+}$ | 10.35 | 10.40 | 9.86 | 7.67 |
| $(La^{3+} + Y^{3+} + Gd^{3+}) \times (Zr^{4+} + Hf^{4+} + Ta^{5+})$ $(\%)^2$ | 383 | 387 | 373 | 178 |
| $n_d$ | 1.851036 | 1.851087 | 1.850102 | 2.04769 |
| $\mu_d$ | 43.40 | 43.38 | 43.52 | 24.49 |
| $\Delta n_d$ | −0.0039 | −0.0041 | −0.0036 | −0.0007 |

As described above, all the optical glasses in Examples satisfied $(La^{3+}+Y^{3+}+Gd^{3+}) \times (Zr^{4+}+Hf^{4+}+Ta^{5+}) \geq 400(\%)^2$, and had $\Delta n_d$ of 0.02 or greater. Further, it was confirmed that the optical glasses in Examples achieved both high refractivity and low dispersibility at the same time.

REFERENCE SIGNS LIST

1 Multi-photon microscope
101 Pulse laser device
102 Pulse division device
103 Beam adjustment unit
104, 105, 112 Dichroic mirror
106 Objective lens
107, 111, 113 Fluorescence detection unit
108 Condensing lens
109 Pinhole
110 Image forming lens
S Sample
2 Imaging device
201 Camera body
202 Lens barrel
203 Lens
204 Sensor chip
205 Glass substrate
206 Multi-chip module
3 Gas levitation furnace
301 Stage
302 Pedestal
303 Laser light source 304, 305 Mirror
306 Radiation thermometer
307 Computer
308 CCD camera
309 Monitor
310 Gas flow rate regulator
L Laser light
M Raw material

What is claimed is:

1. An optical glass, comprising, in terms of mol % of cations:
    a total amount of $La^{3+}$, $Y^{3+}$, and $Gd^{3+}$ components falling within a range of from 5% to 65%; and
    a total amount of $Zr^{4+}$, $Hf^{4+}$, and $Ta^{5+}$ components falling within a range of from 5% to 65%, wherein
    a relationship expressed in Expression (1) given below is satisfied;

$$(La^{3+}+Y^{3+}+Gd^{3+}) \times (Zr^{4+}+Hf^{4+}+Ta^{5+}) \geq 958.4(\%)^2 \quad (1).$$

2. The optical glass according to claim 1, further comprising at least one component selected from a group consisting of $Ga^{3+}$, $Al^{3+}$, $Si^{4+}$, $B^{3+}$, $Mg^{2+}$, $Ca^{2+}$, $Sr^{2+}$, $Ba^{2+}$, $Ti^{4+}$, $Nb^{5+}$, and $W^{6+}$.

3. The optical glass according to claim 1, further comprising: in terms of mol % of cations,
    a $Ga^{3+}$ component falling within a range of from 0% to 60%;
    a $Al^{3+}$ component falling within a range of from 0% to 20%;
    a $Si^{4+}$ component falling within a range of from 0% to 30%; and
    a $B^{3+}$ component falling within a range of from 0% to 10%.

4. The optical glass according to claim 1, further comprising: in terms of mol % of cations,
    a $Ti^{4+}$ component falling within a range of from 0% to 20%;
    a $Nb^{5+}$ component falling within a range of from 0% to 20%;
    a $W^{6+}$ component falling within a range of from 0% to 10%; and
    an $R^{2+}$ (R referrers to one or more selected from a group consisting of Mg, Ca, Sr, and Ba) component falling within a range of from 0% to 10%.

5. The optical glass according to claim 1, further comprising: in terms of mol % of cations, a total amount of $B^{3+}$ and $Si^{4+}$ components is 0%.

6. The optical glass according to claim 1, wherein a refractive index ($n_d$) with respect to a d-line falls within a range of from 1.93 to 2.15.

7. The optical glass according to claim 1, wherein an abbe number ($v_d$) falls within a range of from 25 to 40.

8. The optical glass according to claim 1, wherein $n_d - 0.01023v_d + 2.2988$ is 0.02 or greater.

9. An optical element comprising the optical glass according to claim 1.

10. An optical system comprising the optical element according to claim 9.

11. An interchangeable lens comprising the optical system according to claim 10.

12. An optical device comprising the optical system according to claim 10.

13. An objective lens for microscope comprising the optical element according to claim 10.

14. The optical glass according to claim 1, comprising: in terms of mol% of cations, a total amount of $La^{3+}$, $Y^{3+}$, and $Gd^{3+}$ is from 30% to 60%.

15. The optical glass according to claim 1, comprising: in terms of mol% of cations, a total amount of $La^{3+}$, $Y^{3+}$, and $Gd^{3+}$ is from 40% to 55%.

16. The optical glass according to claim 1, comprising: in terms of mol% of cations, a total amount of $Zr^{4+}$, $Hf^{4+}$, and $Ta^{5+}$ is from 20% to 60%.

17. The optical glass according to claim 1, comprising: in terms of mol% of cations, a total amount of $Zr^{4+}$, $Hf^{4+}$, and $Ta^{5+}$ is from 30% to 60%.

18. The optical glass according to claim 1, wherein the Expression (1) given below is satisfied:
$(La^{3+}+Y^{3+}+Gd^{3+}) \times (Zr^{4+}+Hf^{4+}+Ta^{5+}) \geq 1200(\%)^2$.

19. The optical glass according to claim 1, wherein the Expression (1) given below is satisfied:
$2400(\%)^2 \geq (La^{3+}+Y^{3+}+Gd^{3+}) \times (Zr^{4+}+Hf^{4+}+Ta^{5+})$.

20. The optical glass according to claim 1, wherein the Expression (1) given below is satisfied:
$2000(\%)^2 \geq (La^{3+}+Y^{3+}+Gd^{3+}) \times (Zr^{4+}+Hf^{4+}+Ta^{5+})$.

21. The optical glass according to claim 1, comprising: in terms of mol% of cations, $La^{3+}$ component falling within a range of from 0% to 65%.

22. The optical glass according to claim 1, comprising: in terms of mol% of cations, $La^{3+}$ component falling within a range of from 20% to 60%.

23. The optical glass according to claim 1, comprising: in terms of mol% of cations, $La^{3+}$ component falling within a range of from 30% to 55%.

24. The optical glass according to claim 1, comprising: in terms of mol% of cations, $Y^{3+}$ component falling within a range of from 0% to 10%.

25. The optical glass according to claim 1, comprising: in terms of mol% of cations, $Y^{3+}$ component falling within a range of from 0% to 7%.

26. The optical glass according to claim 1, comprising: in terms of mol% of cations, $Y^{3+}$ component falling within a range of from 0% to 5%.

27. The optical glass according to claim 1, comprising: in terms of mol% of cations, $Gd^{3+}$ component falling within a range of from 0% to 20%.

28. The optical glass according to claim 1, comprising: in terms of mol% of cations, $Gd^{3+}$ component falling within a range of from 0% to 15%.

29. The optical glass according to claim 1, comprising: in terms of mol% of cations, $Gd^{3+}$ component falling within a range of from 0% to 10%.

30. The optical glass according to claim 1, comprising: in terms of mol% of cations, $Zr^{4+}$ component falling within a range of from 0% to 15%.

31. The optical glass according to claim 1, comprising: in terms of mol% of cations, $Zr^{4+}$ component falling within a range of from 0% to 10%.

32. The optical glass according to claim 1, comprising: in terms of mol% of cations, $Zr^{4+}$ component falling within a range of from 0% to 8%.

33. The optical glass according to claim 1, comprising: in terms of mol% of cations, $Hf^{4+}$ component falling within a range of from 0% to 10%.

34. The optical glass according to claim 1, comprising: in terms of mol% of cations, $Hf^{4+}$ component falling within a range of from 0% to 7%.

35. The optical glass according to claim 1, comprising: in terms of mol% of cations, $Hf^{4+}$ component falling within a range of from 0% to 5%.

36. The optical glass according to claim 1, comprising: in terms of mol% of cations, $Ta^{5+}$ component falling within a range of from 5% to 65%.

37. The optical glass according to claim 1, comprising: in terms of mol% of cations, $Ta^{5+}$ component falling within a range of from 10% to 50%.

38. The optical glass according to claim 1, comprising: in terms of mol% of cations, $Ta^{5+}$ component falling within a range of from 15% to 40%.

* * * * *

UNITED STATES PATENT AND TRADEMARK OFFICE
CERTIFICATE OF CORRECTION

PATENT NO. : 11,203,548 B2
APPLICATION NO. : 16/823860
DATED : December 21, 2021
INVENTOR(S) : Kohei Yoshimoto et al.

It is certified that error appears in the above-identified patent and that said Letters Patent is hereby corrected as shown below:

On the Title Page

Column 1, Line 3, delete "SYSTEM" and insert --SYSTEM,--, therefor.

Column 2, Line 1, in (57) delete "mol %" and insert --mol%--, therefor.

Column 2, Line 4, in (57) delete "failing" and insert --falling--, therefor.

Column 2, Line 6, in (57) delete "($Zr^{4+}$ $Hf^{4+}$+" and insert --($Zr^{4+}$+$Hf^{4+}$+--, therefor.

Column 2, Line 7, in (57) delete "$Ta^{3+}$)≥" and insert --$Ta^{5+}$)≧--, therefor.

In the Specification

Column 1, Line 3, Title, delete "SYSTEM" and insert --SYSTEM,--, therefor.

In the Claims

Column 25, Line 10 In Claim 1, delete "mol %" and insert --mol%--, therefor.

Column 25, Line 18 In Claim 1, delete ")≥" and insert --)≧--, therefor.

Column 25, Line 25 In Claim 3, delete "mol %" and insert --mol%--, therefor.

Column 25, Line 35 In Claim 4, delete "mol %" and insert --mol%--, therefor.

Column 25, Line 46 In Claim 5, delete "mol %" and insert --mol%--, therefor.

Column 25, Line 67 In Claim 14, delete "$Gd^{3+}$is" and insert --$Gd^{3+}$ is--, therefor.

Signed and Sealed this
Twenty-sixth Day of April, 2022

Katherine Kelly Vidal
*Director of the United States Patent and Trademark Office*

CERTIFICATE OF CORRECTION (continued)
U.S. Pat. No. 11,203,548 B2

Column 26, Line 3 In Claim 15, delete "$Gd^{3+}$is" and insert --$Gd^{3+}$ is--, therefor.

Column 26, Line 6 In Claim 16, delete "$Ta^{5+}$is" and insert --$Ta^{5+}$ is--, therefor.

Column 26, Line 9 In Claim 17, delete "$Ta^{5+}$is" and insert --$Ta^{5+}$ is--, therefor.

Column 26, Line 12 In Claim 18, delete ")≥" and insert --)≧--, therefor.

Column 26, Line 15 In Claim 19, delete "≥(" and insert --≧(--, therefor.

Column 26, Line 19 In Claim 20, delete "≥(" and insert --≧(--, therefor.

Column 26, Line 21 In Claim 21, delete "$La^{3+}$component" and insert --$La^{3+}$ component--, therefor.

Column 26, Line 24 In Claim 22, delete "$La^{3+}$component" and insert --$La^{3+}$ component--, therefor.

Column 26, Line 27 In Claim 23, delete "$La^{3+}$component" and insert --$La^{3+}$ component--, therefor.

Column 26, Line 30 In Claim 24, delete "$Y^{3+}$component" and insert --$Y^{3+}$ component--, therefor.

Column 26, Line 33 In Claim 25, delete "$Y^{3+}$component" and insert --$Y^{3+}$ component--, therefor.

Column 26, Line 36 In Claim 26, delete "$Y^{3+}$component" and insert --$Y^{3+}$ component--, therefor.

Column 26, Line 39 In Claim 27, delete "$Gd^{3+}$component" and insert --$Gd^{3+}$ component--, therefor.

Column 26, Line 42 In Claim 28, delete "$Gd^{3+}$component" and insert --$Gd^{3+}$ component--, therefor.

Column 26, Line 45 In Claim 29, delete "$Gd^{3+}$component" and insert --$Gd^{3+}$ component--, therefor.

Column 26, Line 48 In Claim 30, delete "$Zr^{4+}$component" and insert --$Zr^{4+}$ component--, therefor.

Column 26, Line 51 In Claim 31, delete "$Zr^{4+}$component" and insert --$Zr^{4+}$ component--, therefor.

Column 26, Line 54 In Claim 32, delete "$Zr^{4+}$component" and insert --$Zr^{4+}$ component--, therefor.

Column 26, Line 57 In Claim 33, delete "$Hf^{4+}$component" and insert --$Hf^{4+}$ component--, therefor.

Column 26, Line 60 In Claim 34, delete "$Hf^{4+}$component" and insert --$Hf^{4+}$ component--, therefor.

Column 26, Line 63 In Claim 35, delete "$Hf^{4+}$component" and insert --$Hf^{4+}$ component--, therefor.

Column 26, Line 66 In Claim 36, delete "$Ta^{5+}$component" and insert --$Ta^{5+}$ component--, therefor.

Column 27, Line 2 In Claim 37, delete "$Ta^{5+}$component" and insert --$Ta^{5+}$ component--, therefor.

Column 27, Line 5 In Claim 38, delete "$Ta^{5+}$component" and insert --$Ta^{5+}$ component--, therefor.